United States Patent [19]
Dimakis

[11] Patent Number: 5,220,760
[45] Date of Patent: Jun. 22, 1993

[54] MULTI-FUNCTIONAL EXTERIOR STRUCTURAL FOAM SHEATHING PANEL

[75] Inventor: Alkiviadis G. Dimakis, Federal Way, Wash.

[73] Assignee: Weyerhaeuser Company, Tacoma, Wash.

[21] Appl. No.: 680,810

[22] Filed: Mar. 22, 1991

[51] Int. Cl.$^5$ .......................... E04C 1/00; C08H 5/04; C08G 18/00
[52] U.S. Cl. .................................. 52/309.9; 527/301; 527/103; 428/534; 428/535; 428/536
[58] Field of Search ............... 52/309.9; 527/103, 301; 428/534, 535, 536

[56] References Cited
U.S. PATENT DOCUMENTS

| | | |
|---|---|---|
| 3,339,503 | 9/1968 | Payne et al. |
| 3,649,430 | 3/1972 | Lewis et al. |
| 3,666,593 | 5/1972 | Hong Man Lee |
| 3,903,346 | 9/1974 | Deleon et al. |
| 3,934,066 | 1/1976 | Murch |
| 4,121,958 | 10/1978 | Koonts |
| 4,344,798 | 8/1982 | Gaul et al. |
| 4,359,507 | 11/1982 | Gaul et al. |
| 4,361,662 | 11/1982 | Gaul et al. |
| 4,382,108 | 5/1983 | Carroll et al. |
| 4,414,361 | 11/1983 | Gaul et al. |
| 4,486,557 | 12/1984 | Gaul et al. |
| 4,764,420 | 8/1988 | Gluck et al. |
| 4,774,794 | 10/1988 | Grieb ........................... 52/309.9 |
| 4,786,547 | 11/1988 | St-Michel |
| 5,008,359 | 4/1991 | Hunter ........................... 527/103 |
| 5,086,599 | 2/1992 | Meyerson ..................... 52/309.9 |

FOREIGN PATENT DOCUMENTS

| | | |
|---|---|---|
| 0005812 | 12/1979 | European Pat. Off. ........... 52/309.9 |
| 0068873 | 6/1982 | European Pat. Off. |
| 0160323 | 5/1985 | European Pat. Off. |
| 0253221 | 7/1987 | European Pat. Off. |
| 0304273 | 2/1989 | European Pat. Off. |
| 2112791 | 7/1983 | United Kingdom |

OTHER PUBLICATIONS

Gaul et al., *Proceedings of the S.P.I. International Technical/Marketing Conference*, pp. 399–407 (1983).

*Primary Examiner*—Carl D. Friedman
*Assistant Examiner*—Wynn E. Wood
*Attorney, Agent, or Firm*—Klarquist, Sparkman, Campbell, Leigh & Whinston

[57] ABSTRACT

An insulating sheathing panel has an insulating core, such as foam, sandwiched between PMDI impregnated cover sheets. The resulting panels offer structural reinforcement as well as insulating qualities to a building framework.

35 Claims, 2 Drawing Sheets

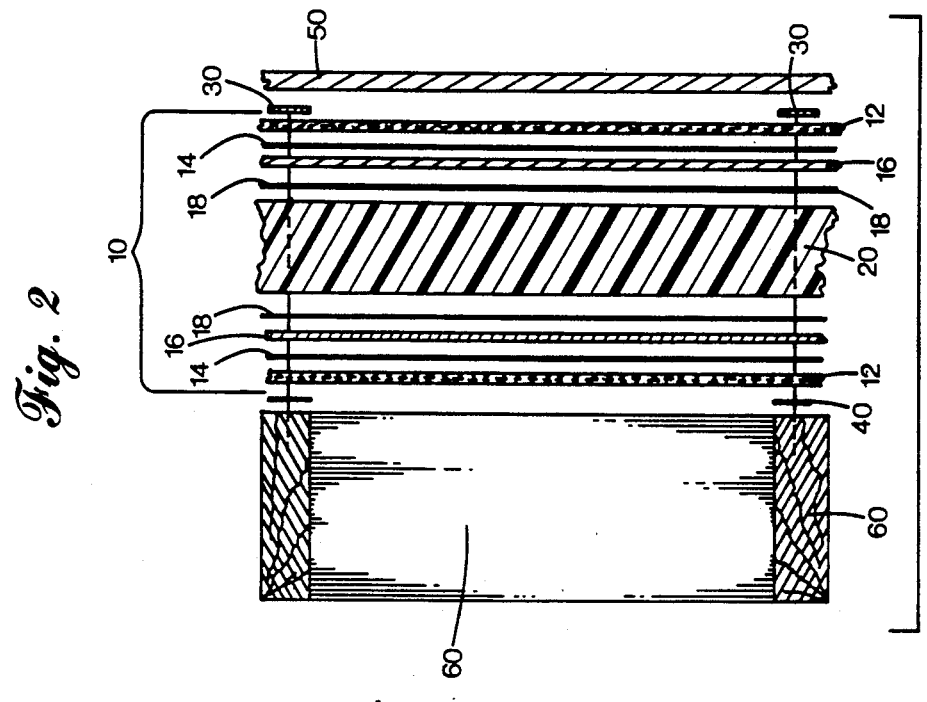
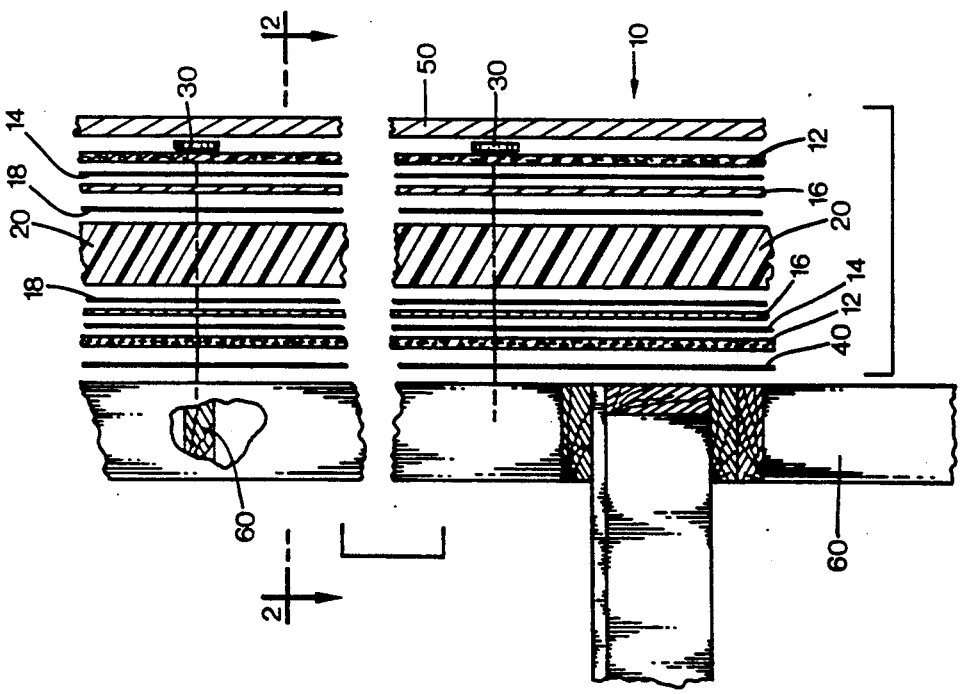

MULTI-FUNCTIONAL EXTERIOR STRUCTURAL FOAM SHEATHING PANEL

BACKGROUND OF THE INVENTION

This invention relates to exterior sheathing panels useful in building construction.

To provide adequate resistance to lateral forces, such as seismic and wind forces, all buildings typically must have bracing attached to the framework of the exterior walls. The materials and labor required to install such bracing adds to the expense of construction. Bracing is generally provided by the application of one or a combination of the following materials to the exterior building walls: metal, wood, plywood, or other reconstituted wood based panels located at the corners and spaced apart at certain distances along the walls. Alternatively, panels made from wood, laminated paperboard or gypsum wallboard are placed about the entire perimeter of the building for reinforcing purposes.

Insulating panels are also commonly placed on the exterior framework of a building. Such panels, which are used to retard heat transfer through the exterior walls, are commonly made of polystyrene, polyurethane, or phenolic foams or glass fiber materials. Sheets of metal foil, used to prevent foam aging, are adhered to the planar surfaces of panels made from such materials. Insulating panels known to the inventor do not have sufficient shear strength and fracture toughness to significantly brace the framework of a building. Therefore, additional exterior wall bracing is used with these insulating panels.

An additional problem associated with available insulative sheathing products is the propensity for such products to puncture or break during either transportation or construction. In light-frame housing construction, workers frequently attach the sheathing to the studs before placing the wall in an upright position. Workers often walk on top of the panels in order to attach the panels to the studs. Walking on known insulating panels can cause them to rupture.

A recurring problem associated with available sheathing is the temperature related expansion and contraction of the panels which causes the panels to retract from the supporting nails. Once a panel retracts, a pathway is created for the infiltration of air and moisture, which reduces the overall thermal performance of the panels.

Therefore, a need exists for improved insulating sheathing panels directed toward overcoming these and additional problems of the prior art.

SUMMARY OF THE INVENTION

The invention is directed to a structural insulating sheathing system consisting of a laminated panel configuration that exhibits excellent tensile strength and fracture toughness. The sheathing panel is designed to meet governmental wind and seismic bracing criteria for residential construction purposes. The strength and composition of the panel allows it to function as a bracing system as well as an insulating system, and thereby simplifies the construction process. In addition, the strength of the panel reduces the degree of care workers must exercise in handling the panels.

As a first aspect of the invention, a panel is preferably comprised of an insulating core sandwiched between tough fibrous sheets. The core is typically composed of a plastic foam material, such as polyisocyanurate foam, but may be composed of a variety of other materials including, but not limited to, polystyrene, polyurethane, or phenolic foams. These materials are light-weight and rigid. First and second cover sheets are secured to the opposed major surfaces of the core. These cover sheets, or sheet facers, are composed of tough polyisocyanate impregnated cellulosic fibers which have been cured by heat and pressure. In these cover sheets, the naturally occurring binders of the cellulosic fiber have been removed and replaced by a polyisocyanate resin.

The sheets are produced using polyisocyanate resin, which may be diluted with an organic solvent and thereafter applied to the fibers. The fibers are generally arranged in a sheet and the resin is applied to both sides of the sheet, such as by spraying, dipping or any other convenient method. After the resin is cured by applying heat and pressure, the cover sheets may be adhered to the core, as by adhesive. Alternatively, the cover sheets may be adhered to the core by the foam which forms the core as the foam is cured between the cover sheets.

Fibrous cover sheets of different thicknesses can be used on opposite sides of the core for particular construction purposes. For example, a thicker sheet may be used on the surface of the core to be spaced from the building framework where the greatest impact or other abuse is likely to occur. When mounted to the framework of the building, the insulating sheathing material of the present invention comprised of the foam core and tough cover sheets exhibits excellent tensile strength and shear modulus. Therefore, the panel can function as a unitary bracing system on the building framework.

Typical foam cores have blowing agents, such as freon, trapped within the closed cells of the core during formation. Sheets of foil may be provided between the core and the cover sheets to block the exchange of the blowing agent and air. The loss of blowing agent over time that would otherwise occur would interfere with the thermal insulation properties of the core. Foil may also be placed at the exterior of the cover sheets as well.

Additionally, one or more layers of weather-protective material may be provided on the exterior surface of one or both of the cover sheets. The weather-protective material, when used, is best applied as a sheet or as a coating. Layers on opposite sides of the panel can be of the same or different thickness and may be made of the same or different materials. Examples of such weather-protective materials, in addition to metallic foils, may include polyethylene films, water sealant coatings and paints. The use of weather-protective materials protects the cover sheet and may also enhance the insulating properties of the panel.

A second aspect of the invention relates to a fastening system for attaching the panels to building frames, such as the stud frames used in residential construction. The fastening system includes both mechanical and chemical fasteners which can be used in combination or separately to attach the panels to the frame.

The preferred mechanical fasteners are generally galvanized large-head roofing nails or staples. These fasteners, whether used separately or in combination, provide a sufficient shear strength to support both the panel and to withstand the forces to which the panel is subjected. The preferred chemical fastener is generally an exterior construction adhesive. Once the adhesive cures, it provides a strong chemical bond between the panel and the building framing.

Additional features, objects and advantages of this invention will be evident from the following detailed description and drawings.

BRIEF DESCRIPTION OF THE DRAWINGS

FIG. 1 is an exploded, partial cross-sectional view of a panel according to the present invention and also showing adjacent studs of the frame of an exterior building wall;

FIG. 2 is an exploded, partial cross-sectional view, taken along line 2—2 of FIG. 1.

DETAILED DESCRIPTION

Figure 3:
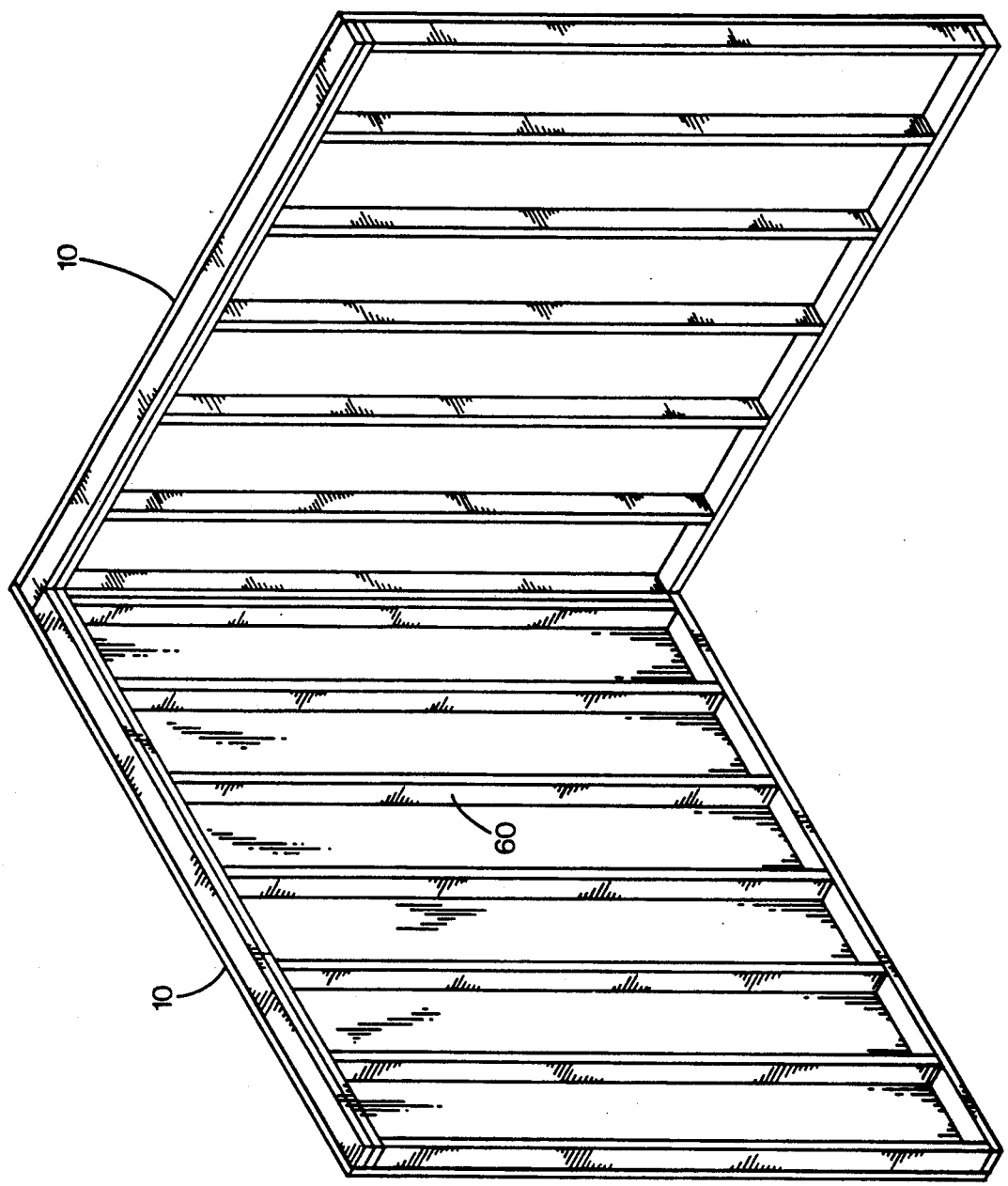
FIG. 3 is an oblique view showing the panels of the invention installed on the frame of an exterior building wall.

As shown in FIGS. 1 and 2, a sheathing panel 10 comprises fibrous sheets 12, optional vapor-impervious sheets 16, and an insulating core 20. The vapor-impervious sheets 16 may be metallic foil or another selected laminate. The core 20 preferably comprises a lightweight rigid insulating plastic material such as a plastic foam. Fibrous sheets 12 are laminated to the vapor-impervious sheets 16, such as by an adhesive 14. The fibrous sheets 12 are secured directly to the core 20 in the event the vapor-impervious sheets 16 are not used. If used, the vapor-impervious sheets 16 are adhered to the core 20 by an adhesive 18. The adhesive 14, 18 is typically an exterior flame-resistant and low smoke producing material, such as a urethane-based adhesive. One specific example is MOR-AD from Morton Thiokol Company.

The core 20 is typically composed of a ply of rigid polyisocyanurate plastic foam, such as a closed-cell polyisocyanurate foam. A preferred embodiment of the core 20 has a core thickness of one-half inch; however, the thickness of the core 20 can be varied over a wide range, such as from about one-eighth to about four inches. Polyisocyanurate foam, when used as the core 20, has a foam density from about one to about four lbs/ft$^3$. A specifically preferred polyisocyanurate foam has a density of about two lbs/ft$^3$, a thickness of one-half inch, and a thermal conductivity of 0.134 Btu in/ft$^2$ hr °F. The shear strength of such a polyisocyanurate core ranges from about fifteen to about twenty-five psi. The shear modulus of such a core ranges from about 500 to about 1,000 psi. Of course, other core materials may also be used, including plastic foams having other formulations.

A fibrous cover sheet 12 may be attached directly to each major planar surface of the core 20, or to exposed major planar surfaces of sheets 16 (if used), thus sandwiching the core 20 therebetween. Each of the cover sheets 12 comprises at least one ply of a fibrous material impregnated with polyisocyanate. The polyisocyanate loading is preferably from about 8% to about 20% w/w of polyisocyanate to the fibrous material.

Preferably the fibrous material is a cellulosic fibrous material, such as substantially delignified cellulose fibers. Such fibers can be obtained from chemical pulp, thermomechanical pulp, recycled fiber, and the like. The fibers can be in the form of non-woven bleached or unbleached paper or paper-like materials, woven mats, sheets or felts, and the like. Delignified cellulosic fibers are obtained by conventional processes wherein naturally-occurring lignins are substantially removed. The purpose of delignification is to remove lignin and other resinous components from the cellulose molecules comprising the fibers so as to expose and make available a greater number of hydroxyl groups on the cellulose molecules for bonding reactions with isocyantes.

The cellulosic material is preferably arranged in a sheet form which has an ability to absorb liquids. A preferred cellulosic material is "kraft liner board," as is known in the art. A preferred basis weight of liner board is within a range of from about 42 to about 69 lb/ft$^2$. Kraft liner board having a basis weight of 58 lb/ft$^2$ is particularly suitable.

The cellulosic material should include a small amount of moisture. Generally, the maximum limit of moisture in the fibers is about 10% w/w water relative to the weight of the cellulose, where the water molecules are generally present as water of dehydration in association with the hydrophilic cellulose fibers. Additional moisture can be added, if required, to the cellulose fibers, such as by applying steam to the fibers, a procedure which may result in improved impregnation of the cellulosic fibers with the polyisocyanate resin.

A preferred resin for the cellulosic fibers is poly(diphenylmethane diisocyanate), referred to in the art as PMDI. Other organic polyisocyanates are usable as long as they possess at least two isocyanate (—NCO) groups per molecule. At least two isocyanate groups are required in order to form cross-linked polymeric materials.

For use in impregnating the cellulosic fibers, the polyisocyanate resin is generally diluted with an organic solvent, such as propylene carbonate, in an amount up to about 20% w/w organic solvent relative to the polyisocyanate. Diluting the polyisocyanate in this manner confers surprisingly improved mechanical properties to the resulting polyurea-cellulose composite, when compared to similar composites made using "neat" (undiluted) polyisocyanate. Approximately 20% w/w solvent to isocyanate is regarded as a practical upper limit, since increasing the solvent above this level also results in additional absorption of water.

The liquid resin comprising a solution of polyisocyanate inorganic solvent can be applied to the cellulosic material in any manner which ensures satisfactory impregnation of the cellulosic fibers. Satisfactory imprenation of the cellulosic fibers with the resin occurs with a loading range of about 8% to about 20% w/w resin relative to the weight of the cellulose. Since the cellulosic material is typically in sheet form, the resin can be applied to one or preferably both sides of the cellulosic sheet by spraying, dipping, rolling, or other means. The cellulosic material may be impregnated with polyisocyanates either by a batch process or by a continuous process.

Following impregnation of the cellulosic material with the resin, the impregnated sheet is cured by the simultaneous application of heat and pressure for a time which typically does not exceed about five minutes. The temperature required to cure the resin is typically within a range of from about 105° C. to about 245° C. and the pressure is typically within a range of from about 130 psi to about 1,200 psi.

An additional example of a method of forming the fibrous sheets 12 can be found in U.S. Patent application Ser. No. 07/618,723, filed Nov. 27, 1990, and entitled "Isocyanate Modified Cellulose Products and Method for Their Manufacture," which application is incorporated herein by reference.

Sheets 12 of the polyisocyanate impregnated and cured cellulosic material are applied to at least one and preferably both of the major surfaces of a rigid substrate, such as the plastic or foam core 20. Single or multiple sheets of the material can be applied to either one or both of the planar surfaces of the core 20.

The preferred thickness of the fibrous cover sheets attached to core 20 is about 0.023 inches (e.g. two plys of 58 lb. kraft liner material), although the thickness may vary such as from about $8.5 \times 10^3$ to 0.1 inches. The preferred density of cover sheet 12 is about 65–70 pcf, which exhibits a tensile strength of from about 18,000 to about 24,000 psi in the machine direction (in the major plane of the cover sheets) and a stiffness (Young's modulus) of from about $1.8 \times 10^6$ to about $2.2 \times 10^6$ psi in the machine direction.

When a panel is formed of cover sheets of this construction (for example, two-plies of 58 lb. kraft liner board, loaded with from about 8% w/w to about 20% w/w PMDI and cured to from 65–70 pcf), it has been found to have a machine direction linear expansion at from 50% to 90% humidity and 65° F. of less than 0.1 inch per inch in the major direction. Therefore, a panel of excellent stability is provided. Also, such a panel has a water vapor transmission rate of at least 3.5 perms when tested in accordance with ASTM D2646. Moreover, such a panel has been found to have a water absorption at 96 hours of no more than about 6.5% when tested according to ASTM D2642. Furthermore, tests of such a panel pursuant to ASTM C318 confirmed that the panels had a thermal conductivity (with a one-half inch core) of no more than about 0.134 Btu in/h·ft$^2$.° F. In addition, the modulus of rupture of such a panel in the major plane was at least about 800 psi in the major plane (machine direction) and about 200 psi in the cross machine direction, when tested per ASTM C393.

Laminated between the polyisocyanate impregnated cellulosic fiber 12 and the core 20, if used, are blowing agent retaining sheets such as metallic foil sheets 16 which generally have a thickness of from about $2.5 \times 10^3$ to about $9.0 \times 10^3$ inches. The foil may be adhered to the fibrous material 12 by a one-component urethane solids adhesive 14, as previously described.

The sheathing panels can be produced in a continuous process or a batch process. In a typical continuous process, the treated and cured fibrous cover sheets are continuously unrolled and supported with a gap therebetween. The foam forming material is injected into this gap and fills the gap with foam, the foam attaching itself to the cover sheets. Individual panels are then cut from the sheets (e.g. four feet wide by eight or nine feet long panels). In a batch process, treated and cured fibrous cover sheets are typically adhesively secured to preformed foam panels. In either case, foil 16 may be and preferably is, interposed between the foam core and cover sheets.

If used, the metallic foil is generally primed with adhesive on both sides for better adhesion to the insulating core and fibrous sheet 12, using adhesives as previously described. Metallic foil 16 can be adhered to either or both sides of the core 20.

Various weather protection materials may also be incorporated into the sheathing panel. Examples of such materials include layers of polyethylene film, urethane resin, paint, water sealant coatings or aluminum foil. If used, preferably one or more layers of such a material are applied to the outwardly-facing or exposed planar surface of one or both of the fibrous sheets 12. Also, siding 50 may be placed over the exposed outer surface of the panels 10.

The panels can be used in a number of ways to insulate and brace light-frame houses and other buildings. For instance, when panels 10 are mounted at the corners of a conventional building stud frame as shown in FIG. 3, no additional bracing is required at the corners. The panels can be secured to the frame either by mechanical or adhesive fasteners, separately or in combination. For additional bracing, the panels of the inventor can be positioned at the corners and also at intervals along the perimeter of the wall, or around the entire perimeter of the building.

To attach the panels to stud frames using adhesive, adhesive is typically applied either to the exterior surface of the studs or to the portions of the panel which are to contact the studs. For example, a ¼ to ⅜ inch bead of adhesive may be applied uniformly to all framing components. Alternatively, a thin veneer of adhesive may be applied to the region of the panel ultimately contacting the studs. Exemplary adhesives include construction adhesives such as Morad, 100% solids/solvent adhesive from Morton Thiokol Company and H. B. Fuller Max bond. Once the adhesive is applied, the sheathing panel 10 may thereafter be secured to the studs by using, for example, broad-head galvanized iron roofing nails 30, having a ⅜ inch head diameter. Alternatively, 7/16 crown galvanized wire staples can be used to secure the panel to the studs. The nails or staples can be applied using a pneumatic gun set to 40 to 50 psi air pressure, and are most effective when evenly spaced at 3 inches center-to-center spacing at the perimeter and at 6 inches center-to-center spacing on all other intermediate supports. The broad-head galvanized nails or galvanized staples can be used to provide adequate pressure while the adhesive is curing; however, the mechanical fasteners or chemical fasteners can be used singularly. Other mechanical fasteners may of course also be used.

When panels having treated cover sheets and a one-half inch thick foam core were mounted to a standard "two" by "four" lumber framework (2×4 studs, standard and better grade, on 16 inch center-to-center spacing with a single bottom or sole plate and a double top plate, the racking shear strength determined under ASTM E-72 Test Standard was (1) at least 9,000 lbs. when the panels were mounted with a combination of a ⅜ inch bead of H. B. Fuller Max bond construction adhesive and either No. 11 gauge, 1½ inch long large head galvanized roofing nails (3" center-to-center spacing at the edge of the panels and 5" center-to-center spacing in the field of the panels intermediate to the panel edges or 7/16" crown, 16 guage, 1½" legs galvanized staples at the same spacing as the nails, and following curing or drying of the adhesive; (2) 3,500 lbs. for these nails at this spacing without the adhesive; and (3) 2,600 lbs. for these staples at this spacing without the adhesive. The primary function of the nails and staples when adhesive is used is to hold the panels in place until the adhesive sets. These mechanical fasteners can be eliminated if quick setting adhesive or other means for holding the panels in place is used. Also, the racking shear strength without the mechanical fasteners and with only the adhesive would also be expected to be at least 9,000 lbs. following the curing of the adhesive, however, some other mechanism (such as clamps or gravity) would be used to hold the panels in place, if necessary) while the adhesive cures.

Having illustrated and described the principles of my invention with reference to several preferred embodiments, it should be apparent to those of ordinary skill in the art that the invention may be modified in arrangement and detail without departing from such principles. I claim as my invention all such modifications which fall within the scope of the following claims.

I claim:

1. A sheathing panel comprising:
a core sheet of a manufactured cellular foam material having first and second major opposed surfaces;
first and second cover sheets secured to the respective first and second major opposed surfaces with the core sheet therebetween, the first and second cover sheets each comprising at least one sheet of cellulosic material impregnated with polyisocyanate within a range of about 8% to 20% by weight of polyisocyanate to cellulosic material with the polyisocyanate being heat cured.

2. A panel according to claim 1 in which each of the major opposed surfaces of the core sheet is overlayed with a respective blowing agent retaining sheet.

3. A panel according to claim 2 in which the blowing agent retaining sheets are comprised of a metallic foil.

4. A panel according to claim 1 in which at least one of the cover sheets is overlayed with a thermal reflective material.

5. A panel according to claim 4 in which the thermal reflective material comprises a metallic foil.

6. A panel according to claim 3 in which at least one of the cover sheets is overlayed with a thermal reflective material.

7. A panel according to claim 1 in which the cover sheets are cellulosic paper or pulp sheets.

8. A panel according to claim 1 in which the core has a shear strength of from at least about 10 to about 30 psi and a shear modulus of from at least about 500 psi to about 1,000 psi, the cover sheets having a machine direction tensile strength of from about $1.8 \times 10^4$ to $2.4 \times 10^4$ psi in the major pane of the cover sheets and a Young's modulus in the machine direction of from about $1.8 \times 10^6$ psi to about $2.2 \times 10^6$ psi.

9. A panel according to claim 8 in which the core has a thickness of from about ⅛ to 4 inches and a density in the range of from about 1 to about 4 pounds per cubic foot.

10. A panel according to claim 9 in which the cover sheets have a thickness of from about $8.5 \times 10^{-3}$ inch to about 0.1 inch.

11. A panel according to claim 10 including a thermal reflective material overlaying at least one of the cover sheets.

12. A panel according to claim 10 including a respective blowing agent retaining sheet between the core sheet and each of the cover sheets.

13. A panel according to claim 1 in which the cover sheets comprise cellulosic liner material impregnated with from about 8% to 15% by weight of polyisocyanate to cellulosic material, which is cured to a density of from about sixty-five to about seventy pcf, and having a machine direction linear expansion at from 50% to 90% humidity and 65° F. of less than 0.1 inch per inch in the major direction.

14. A panel according to claim 1 in which the cover sheets comprise cellulosic liner material impregnated with from about 8% to 15% by weight of polyisocyanate to cellulosic material, which is cured to a density of from about sixty-five to about seventy pcf, and having a water vapor transmission rate of at least 3.5 perms.

15. A panel according to claim 1 in which the cover sheets comprise cellulosic liner material impregnated with from about 8% to 15% by weight of polyisocyanate to cellulosic material, which is cured to a density of from about sixty-five to about seventy pcf, and having a water absorption at 96 hours of no more than about 6.5%.

16. A panel according to claim 1 having a thermal conductivity of no more than about 0.134 B.T.U.-:in/h.ft².°F.

17. A panel according to claim 1 having a modulus of rupture in the major plane of at least about 800 psi.

18. A panel according to claim 1 in which the first and second cover sheets are of differing thicknesses.

19. Plural panels according to claim 1 mounted at least to a corner of a conventional building stud frame without other reinforcing bracing at such corner, the panels being secured to the frame by an adhesive and having a racking shear strength of at least 9,000 lbs.

20. Plural panels according to claim 1 mounted at least to a corner of a conventional building stud frame without other reinforcing bracing at such corner, the panels being secured to the frame by mechanical fasteners only and having a racking shear strength of at least 2,600 lbs.

21. Plural panels according to claim 1 mounted at least to a corner of a conventional building stud frame without other reinforcing bracing at such corner, the panels being secured to the frame by mechanical fasteners only and having a racking shear strength of at least 3,500 lbs.

22. A sheathing panel comprising:
a core sheet of a manufactured cellular foam material having first and second major opposed surfaces, a thickness of from ⅛ inch to four inches and a density in the range of from about one to about four pounds per cubic foot;
first and second cover sheets secured to the respective first and second major opposed surfaces with the core sheet therebetween, the first and second cover sheets each comprising at least one sheet of cellulosic material with cured polyisocyanate within a range of about 8 percent to 20 percent by weight of polyisocyanate to cellulosic material; and
wherein the core has a shear strength of from at least about 10 to about 30 psi and a shear modulus of from at least about 500 psi to about 1,000 psi, the cover sheets having a machine direction tensile strength of from about $1.8 \times 10^4$ to $2.4 \times 10^4$ psi in the major plane of the cover sheets and a Young's modulus in the machine direction of from about $1.8 \times 10^6$ psi to about $2.2 \times 10^6$ psi.

23. A panel according to claim 22 including a thermal reflective material overlaying at least one of the cover sheets.

24. A panel according to claim 22 including a respective blowing agent retaining sheet between the core sheet and each of the cover sheets.

25. A panel according to claim 22 in which the cover sheets comprise cellulosic liner material impregnated with from about 8 percent to 15 percent by weight of polyisocyanate to cellulosic material, which is cured to a density of from about sixty-five to about seventy pcf, having a machine direction linear expansion at from 50 percent to 90 percent humidity and 65° F. of less than 0.1 inch per inch in the major direction, having a water vapor transmission rate of at least 3.5 perms, and having a water absorption at 96 hours of no more than about 6.5%.

26. A pane according to claim 25 including a respective blowing agent retaining sheet between the core sheet and each of the cover sheets.

27. A panel according to claim 26 including a thermal reflective material overlaying at least one of the cover sheets.

28. Plural panels according to claim 22 mounted at least to a corner of a conventional building stud frame without other reinforcing bracing at such corner.

29. Plural panels according to claim 22 mounted at least to a corner of a conventional building stud frame without other reinforcing bracing at such corner, the panels being secured to the frame by an adhesive and having a racking shear strength of at least 2,600 lbs.

30. Plural sheathing panels mounted at least to a corner of a conventional building stud frame without other reinforcing bracing at such corner, each of such panels comprising:
a core sheet of a manufactured cellular foam material having first and second major opposed surfaces;
first and second cover sheets secured to the respective first and second major opposed surfaces with the core sheet therebetween, the first and second cover sheets each comprising at least one sheet of cellulosic material with polyisocyanate within a range of about 8 percent to 20 percent by weight of polyisocyanate to cellulosic material.

31. Plural panels according to claim 30 secured to the frame by adhesive and having a racking shear strength of at least 9,000 lbs.

32. A panel according to claim 30 in which at least one of the cover sheets is overlayed with a thermal reflective material.

33. A panel according to claim 30 in which each of the major opposed surfaces of the core sheet is overlayed with a respective blowing agent retaining sheet.

34. A panel according to claim 30 in which the core has a shear strength of from at least about 10 to about 30 psi and a shear modulus of from at least about 500 psi to about 1,000 psi, the cover sheets having a machine direction tensile strength of from about $1.8 \times 10^4$ to $2.4 \times 10^4$ psi in the major plane of the cover sheets and a Young's modulus in the machine direction of from about $1.8 \times 10^6$ psi to about $2.2 \times 10^6$ psi.

35. A panel according to claim 30 in which the core has a thickness of from about ⅛ to 4 inches and a density in the range of from about 1 to about 4 pounds per cubic foot.

* * * * *